United States Patent
Hewitt et al.

(10) Patent No.: US 10,601,187 B2
(45) Date of Patent: Mar. 24, 2020

(54) OVERLOAD PREVENTION IN A POWER DISTRIBUTION UNIT WITH ELECTRICAL POWER OUTLET SOCKETS

(71) Applicant: International Business Machines Corporation, Armonk, NY (US)

(72) Inventors: James Hewitt, Eastleigh (GB); Colin I. Holyoake, Braishfield (GB); Richard Postlethwaite, Salisbury (GB); Caroline J. Thomas, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 15/627,574

(22) Filed: Jun. 20, 2017

(65) Prior Publication Data
US 2018/0366885 A1 Dec. 20, 2018

(51) Int. Cl.
| | |
|---|---|
| H01R 13/713 | (2006.01) |
| H01R 25/00 | (2006.01) |
| H01R 27/02 | (2006.01) |
| H01R 13/66 | (2006.01) |
| G05B 15/02 | (2006.01) |

(52) U.S. Cl.
CPC ........... *H01R 13/713* (2013.01); *G05B 15/02* (2013.01); *H01R 13/6666* (2013.01); *H01R 13/6683* (2013.01); *H01R 25/006* (2013.01); *H01R 27/02* (2013.01)

(58) Field of Classification Search
None
See application file for complete search history.

(56) References Cited

U.S. PATENT DOCUMENTS

| | | |
|---|---|---|
| 6,295,003 B1 | 9/2001 | Wu |
| 2007/0054520 A1 | 3/2007 | Wu |
| 2007/0096932 A1 | 5/2007 | Lai |
| 2009/0040056 A1 | 2/2009 | Yang |

(Continued)

FOREIGN PATENT DOCUMENTS

DE 102015001945 * 8/2016 ............ H01H 71/40

OTHER PUBLICATIONS

Tan et al., Power Socket Programmable Circuit Breaker System, Published in: Power and Energy Conference, 2008. PECon 2008. IEEE 2nd International, Date of Conference: Dec. 1-3, 2008, Date Added to IEEE Explore: Jan. 27, 2009, Retrieved from Internet on Jun. 20, 2017, URL: http://ieeexplore.ieee.org/document/4762531/, 2 pages.

*Primary Examiner* — Bernard G Lindsay
(74) *Attorney, Agent, or Firm* — Schmeiser, Olsen & Watts, LLP; Michael Petrocelli (57) ABSTRACT

An electrical power distribution unit for overload prevention is provided. The power distribution unit has a plurality of electrical power outlet sockets each for receiving a power plug and a power distribution system for supplying electrical power to each of the sockets. The power distribution unit includes an excess power detector for detecting an aggregate power drawn from the plurality of sockets and for actuating a disabling mechanism for disabling power supply for a subset of the sockets in response to the detected aggregate power exceeding a predetermined first threshold, wherein the subset of the sockets are sockets that are detected as currently not drawing power.

16 Claims, 9 Drawing Sheets

(56) References Cited

U.S. PATENT DOCUMENTS

| | | | |
|---|---|---|---|
| 2009/0282274 A1* | 11/2009 | Langgood | G06F 1/3203 |
| | | | 713/320 |
| 2011/0190953 A1* | 8/2011 | Park | G05B 15/02 |
| | | | 700/291 |
| 2011/0254371 A1* | 10/2011 | Galsim | G06F 1/263 |
| | | | 307/39 |
| 2011/0270458 A1 | 11/2011 | Liu | |
| 2015/0130276 A1* | 5/2015 | McNeill-McCallum | |
| | | | H02J 3/00 |
| | | | 307/23 |
| 2015/0333503 A1* | 11/2015 | Bermingham | H02H 7/268 |
| | | | 361/62 |
| 2017/0125984 A1* | 5/2017 | Mergener | H02B 1/52 |
| 2017/0345600 A1* | 11/2017 | Naumann | H01H 9/0271 |
| 2018/0241206 A1 | 8/2018 | Hewitt et al. | |

* cited by examiner

OVERLOAD PREVENTION IN A POWER DISTRIBUTION UNIT WITH ELECTRICAL POWER OUTLET SOCKETS

TECHNICAL FIELD

The present invention relates to a power distribution unit, and more specifically, to a power distribution unit having an overload prevention system.

BACKGROUND

Power distribution units provide an input source of power to multiple socket outlets, which enables a single source of power to feed to multiple electrical appliances. In a domestic electricity environment, a power distribution unit may be an extension lead with a housing for multiple sockets, which is plugged into a wall socket for power supply. Similar power distribution units may be used in industrial environments plugged into a wall socket or supplied by an industrial power supply, such as a generator. In a data center environment, power distribution units may be provided within the data center providing multiple power sockets often in the form of power poles. The power poles may have power sources supplied from a commercial power point.

SUMMARY

An electrical power distribution unit for overload prevention is provided, comprising: a plurality of electrical power outlet sockets, each electrical power outlet socket of the plurality of electrical power outlet sockets configured to receive a power plug, a power distribution system for supplying electrical power to the plurality of electrical power outlet sockets, and an excess power detector for detecting an aggregate power drawn from the plurality of electrical power outlet sockets and for actuating a disabling mechanism for disabling power supply for a subset of the plurality of electrical power outlet sockets in response to the detected aggregate power exceeding a predetermined first threshold, wherein the subset of the plurality of electrical power outlet sockets are sockets that are detected as currently not drawing power.

A method, computer system, and computer program product for preventing overload of an electrical power distribution unit is provided. A processor of a computing system controls the selective disabling of the one or more sockets by monitoring an aggregate power drawn from the sockets, determining if the aggregate power exceeds a predetermined first threshold, and actuating a disabling mechanism for a subset of the power outlet sockets that are detected as currently not drawing power.

DETAILED DESCRIPTION

A wall socket or commercial power point can easily be overloaded when using a power distribution unit, whether located within a domestic property, industrial environment, or a data center environment. For example in a home environment, an extension lead with a circuit designed for 13 Amps may be plugged into a wall socket. The extension lead may have 10 sockets supplying 10 devices all running at 3 Amps. Another extension lead may be plugged into one of the 10 sockets providing two extension leads in series. The devices may be running at a total of 32 Amps, which is less than a house ring mains fuse trip; however, the total of 32 amps exceeds the 13 Amp extension socket designed cabling, which means there is a high risk of fire by overloading a plug socket and/or cabling within the extension lead. The wire of the extension lead may become warm eventually creating a fire.

Circuit breakers and fuses exist which are designed to stop the electricity supply if the electricity supply is greater than the circuit breaker or fuse allowance. However, circuit breakers and fuses do not always activate at the maximum load and can survive with gradual load increases.

In addition, there are known power distribution units, which monitor and provide warnings of potential power overloads. The warning may provide an alert to take preventive action. Known power distribution units have the disadvantage of requiring the monitoring and to be correctly set up for alerts. Ignoring such alerts provides a continued risk.

Furthermore, electrical power distribution units provide multiple outputs in the form of sockets for power plugs in order to distribute electric power from a single source. Power distribution units may be provided for a domestic environment or for a commercial data center environment, as well as other industrial applications.

Figure 1A:
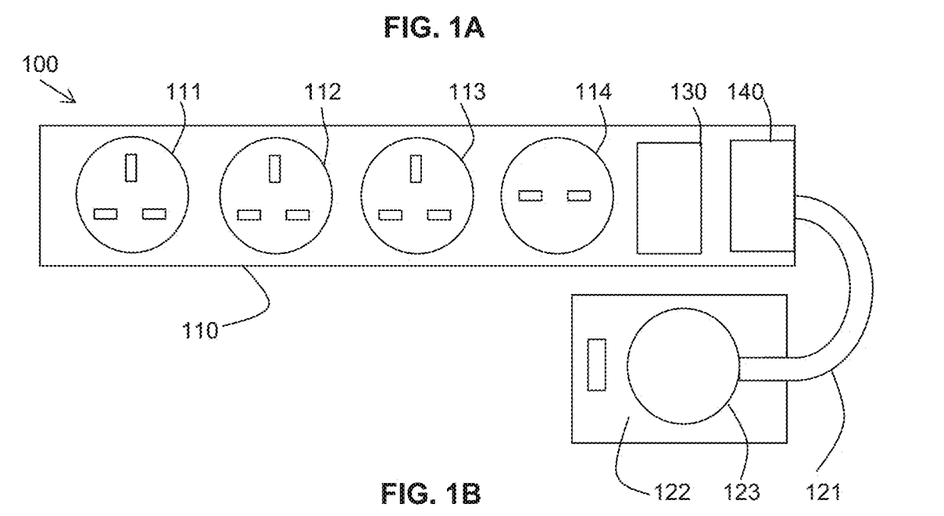
FIG. 1A depicts a schematic view of a power distribution unit for a domestic environment in the form of an electrical adapter for increasing the number of sockets available from a mains electricity wall socket, in accordance with embodiments of the present invention.
Figure 1B:
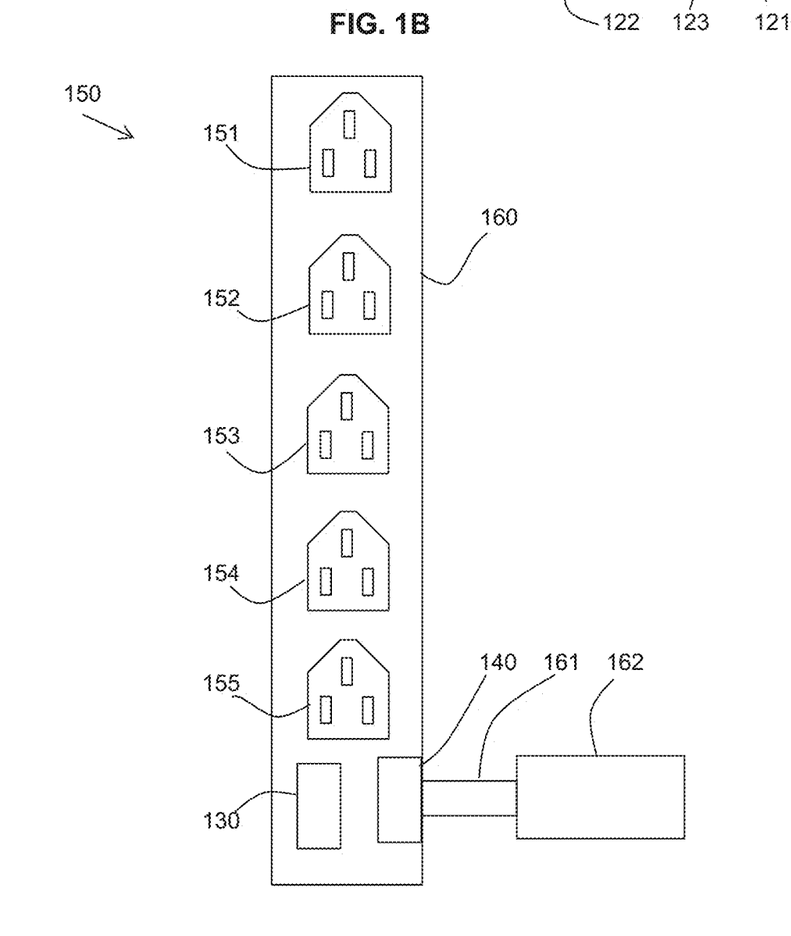
FIG. 1B depicts a schematic view of a power distribution unit for a data center environment in the form of power pole or rack providing multiple sockets supplied from a commercial power supply, in accordance with embodiments of the present invention.

Referring to the drawings, FIG. 1A depicts a schematic view of a power distribution unit 100 for a domestic environment in the form of an electrical adapter for increasing the number of sockets available from a mains electricity wall socket, in accordance with embodiments of the present invention. FIG. 1B shows a power distribution unit 150 for a data center environment in the form of power pole or rack providing multiple sockets 151-155 supplied from a commercial power supply 162. FIGS. 1A and 1B depict schematic diagrams of two types of power distribution units 100, 150 in which the described overload prevention system may be implemented.

The power distribution unit 100 includes a housing 110, which in this example is shown as an elongate housing. Other forms of housings may be provided, such as a square configuration, a circular wheel-like configuration, etc. The housing 110 provides multiple sockets 111-114 for receiving electric plugs (not shown) of appliances. The sockets 111-114 may take different forms to accommodate different formats of electric plug. For example, sockets may be provided for earthed three-pin plug and/or two-pin unearthed plugs for double-insulated appliances. Sockets 111-114 may also take varying forms depending on the standard of a country or region.

The housing 110 may accommodate the internal support and wiring of the sockets 111-114 as fed from an external power source. The external power source may be provided from a mains wall socket 122 fed from a domestic mains electricity supply. A plug 123 may be attached to an input cable 121 feeding to the internal support and wiring of the sockets 111-114.

A fuse may be provided by the power distribution unit 100 between the external power supply and the sockets 111-114 to disable the power distribution unit 100 if too much current is drawn from the sockets 111-114.

FIG. 1B shows a power distribution unit 150 for a data center environment in the form of power pole or rack providing multiple sockets 151-155 supplied from a commercial power supply 162, which may have an input cable 161 to the power distribution unit 150. The power distribution unit 150 may be for direct current (DC) appliances or alternating current (AC) appliances.

The power distribution unit 150 includes a housing 160, which in this example is shown as an elongate vertical housing. The housing 160 provides multiple sockets 151-155 for receiving electric plugs (not shown) of appliances. Common appliances in a data center may include servers, storage area networks (SANs), network switches, etc. The sockets 151-155 may take different forms to accommodate different formats of electric plug; however, a common socket for a commercial data center may be a C13 socket for a C14 plug as defined by International Electrotechnical Commission (IEC) specification IEC 60320.

The housing 160 may accommodate the internal support and wiring of the sockets 151-155 as fed by the input cable 161 from the power supply 162.

A fuse may be provided by the power distribution unit 150 between the power supply 162 and the sockets 151-155 to disable the power distribution unit 150 if too much current is drawn from the sockets 151-155.

In both environments, it is known to include an aggregate current ammeter 140 to measure the aggregate current being drawn by the sockets 111-114, 151-155 and, optionally, an alert generator for generating an alert if the drawn power reaches an unacceptable high level, before a fuse in the power distribution unit 100, 150 is blown.

In the described systems, the power distribution units 100, 150 include an overload prevention system 130 that is described in more detail below. The overload prevention system 130 controls the disabling of one or more sockets 111-114, 151-155 which are not currently drawing power when an aggregate current drawn by the in-use sockets 111-114, 151-155 reaches a predetermined first threshold close to the maximum capacity of the power distribution unit 100, 150 or associated components.

The overload prevention system 130 detects an aggregate power drawn from the sockets, for example, using an ammeter 140 at the power input to the power distribution unit 100, 150, and actuates an electrical disabling mechanism for each of any of the power outlet sockets that is not currently drawing power in response to the detected aggregate power exceeding the predetermined first threshold.

Figure 2:
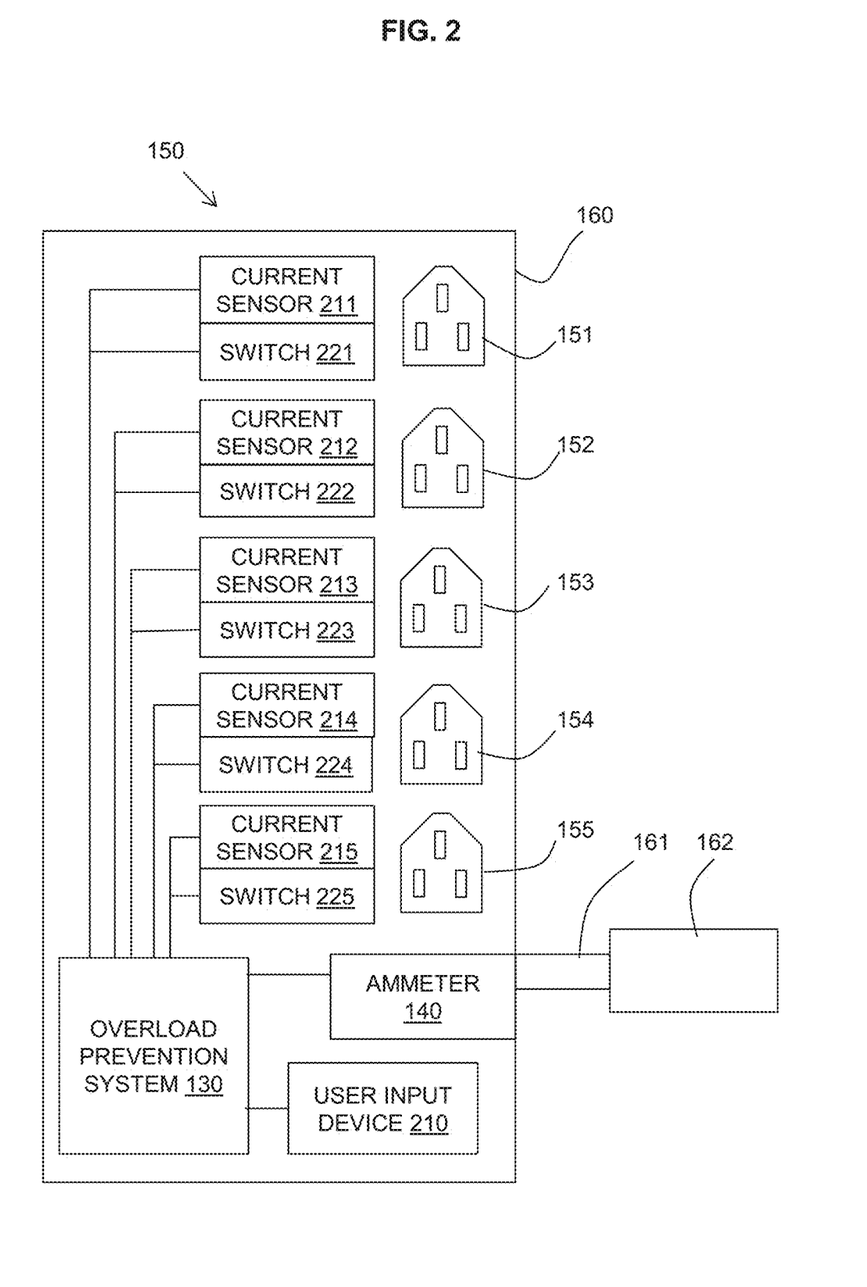
FIG. 2 depicts an embodiment of a power distribution unit having an overload prevention system, in accordance with embodiments of the present invention.

FIG. 2 depicts an embodiment of a power distribution unit 150 having an overload prevention system 130, in accordance with embodiments of the present invention. The embodiment of the overload protection system 130 is shown with reference to the power distribution unit 150 of FIG. 1B; however. It will be appreciated that the overload protection system 30 may equally be provided with respect to the power distribution unit 100 of FIG. 1A.

Referring to FIG. 2, the disabling mechanism is provided as an electrical disabling mechanism in the form of an electrical switch 221-225 that may be activated to prevent electrical supply to a socket 151-155.

In response to the aggregate current reaching a first threshold, the overload prevention system 130 may actuate the electrical disabling mechanism provided at each or a selection of the sockets 151-155. There may be one or more sockets 151-155 which may not be disabled, for example, due to priority devices being supplied by the sockets.

Current sensors 211-215 may be provided at each of the sockets 151-155 to determine if current is being supplied to the socket 151-155, which enables the overload prevention system 130 to determine which sockets 151-155 are not currently drawing current and to switch the electricity supply to these unused sockets off.

The unused sockets may have plugs inserted in the unused sockets that are not currently being used, which has useful applications particularly in a data center where many appliances are left plugged in when not in use.

In response to the aggregate current reaching a first threshold, the overload prevention system 130 may actuate the electrical disabling mechanism selectively switching off the currently non-drawing sockets, which prevents the subsequent drawing of current from the socket whether a plug is already in the socket or subsequently inserted.

The overload prevention system 130 may also include additional control once the electrical disabling mechanism has been activated for non-drawing sockets. If the aggregated current drawn by the power distribution unit continues to increase and reaches a second threshold that is higher than the first threshold due to increased draw by the existing drawing sockets, the electrical disabling mechanism may be actuated to disable one or more of the drawing sockets. The drawing socket to be disabled may be selected randomly or in accordance with a predefined configuration.

The overload prevention system 130 may also include control of a re-enabling mechanism which may de-actuate the electrical disabling mechanisms when the aggregated current drawn by the power distribution unit falls below a third threshold at which it is deemed safe to allow further plugs to draw additional current. The re-enabling mechanism may switch the current to the disabled sockets back on.

Additionally, an override system may be provided with a user input device 210 provided in the housing 160 of the power distribution unit 150, which may override the overload prevention system 130 and prevent actuation or de-actuate the electrical disabling mechanism. The user input device 210 may be a manual override, such as a switch.

Figure 3A:
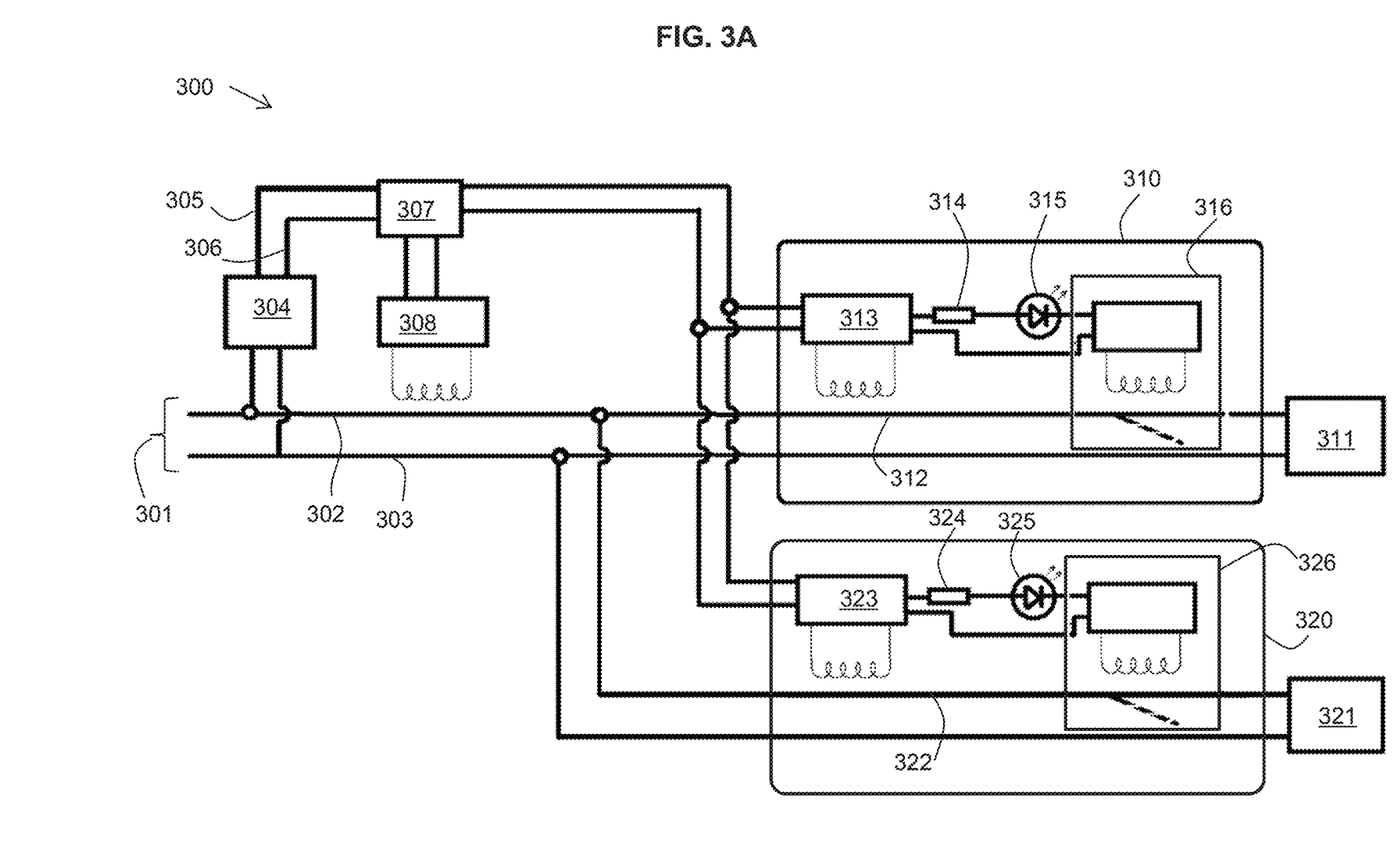
FIG. 3A depicts electrical disabling mechanisms for each load, wherein the electrical disabling mechanisms each have a combined current sensor and switch, in accordance with embodiments of the present invention.
Figure 3B:
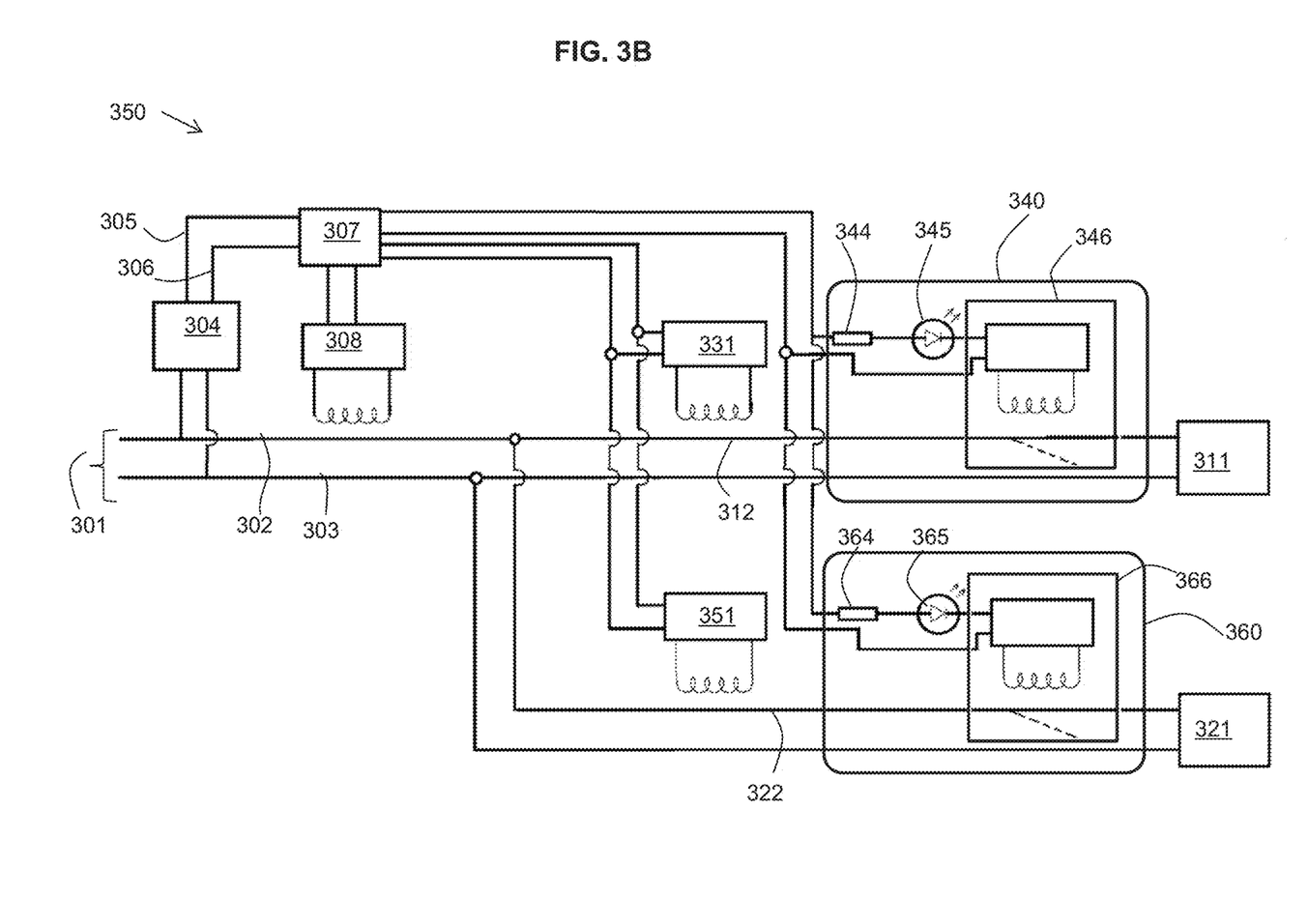
FIG. 3B depicts electrical disabling mechanisms for each load, wherein the electrical disabling mechanisms are separate from the load ammeters for each load, in accordance with embodiments of the present invention.

FIG. 3A depicts electrical disabling mechanisms 310, 320 for each load 311, 321, wherein the electrical disabling mechanisms 310, 320 each have a combined current sensor 211 and switch 221, in accordance with embodiments of the present invention. FIG. 3B depicts electrical disabling mechanisms for each load 311, 321, wherein the electrical disabling mechanisms 340, 360 are separate from the load ammeters 331, 351 for each load 311, 321, in accordance with embodiments of the present invention FIGS. 3A and 3B depict circuit diagrams 300, 350 which are two example embodiments of the overload prevention system 130 and electrical disabling mechanisms including current sensors 211-215 and switches 221-225 as provided at sockets 151-155 of a power distribution unit 150.

In both embodiments, shown in FIGS. 3A and 3B, a power source provides power to a power cable 301 which comprises live and earth alternating current lines 302 and 303.

External loads 311, 321 may be provided in the form of sockets 151-155 which may draw power from the power cable 301 when a device is plugged into the socket 151-155 and switched on. In FIGS. 3A and 3B, two loads 311, 321 are shown; however, it will be appreciated that additional loads may be provided repeating the arrangement of the electrical components shown associated with the loads 311, 321.

An overload prevention system 130 in the form of an excess power detector with a disabling mechanism actuator may be provided by a central processing unit (CPU) 307, which may be powered by a power supply unit 304 connected to the power cable 301 which may be an AC to DC converter for generating low voltage DC for providing appropriate power via lines 305, 306 to the CPU 307 and associated circuitry.

The CPU 307 receives input from an aggregate power ammeter 308 sensing the current drawn on the power cable 301 from all of the loads 311, 321 of the sockets 151-155. The CPU 307 carries out the functionality of the overload prevention system 130 to monitor the output of the aggregate power ammeter 308 to measure the total power being drawn on the power cable 301 from the sockets 151-155 to determine if the power distribution unit 150 is overloaded according to the defined threshold(s). If overloaded, the CPU 307 actuates the disabling mechanisms at a subset of the sockets 151-155.

Referring to FIG. 3A, a first embodiment shows electrical disabling mechanisms 310, 320 for each load 311, 321, wherein the electrical disabling mechanisms 310, 320 each have a combined current sensor 211 and switch 221.

The electrical disabling mechanism 310, 320 is provided incorporated into a socket 151-155 to switch power off to the socket 151-155 if the socket is not drawing any current when the CPU 307 triggers the disabling of non-drawing sockets due to a total power being drawn by other sockets exceeding a predetermined first threshold.

The electrical disabling mechanisms 310, 320 are provided as circuits connected to the power supply unit 304 to receive the low voltage DC power for powering a relay switch 316, 326. The power may be switched off to a socket 151-155 by the relay switch 316, 326, which in an exemplary embodiment may be a Single Pole Double Throw (SPDT) relay, however, other suitable forms of switches or load preventing devices may be used.

The electrical disabling mechanism 310, 320 may include an ammeter 313, 323 for measuring the power drawn by the load 311, 321, referred to as a load ammeter 313, 323, a resistor 314, 324, a light 315, 325 (e.g. in the form of a light emitting diode), and a relay switch 316, 326.

Power is supplied from the power supply unit 304 to each relay switch 316, 326 when the overload prevention system 130 is actuated to power the electrical disabling mechanisms 310, 320 and conditional upon whether any power is being drawn by the power line 312, 322 of the load 311, 321.

The load ammeter 313, 323 of the electrical disabling mechanisms 310, 320 may be provided with an inductive proximity sensor that may include an inductive coil arranged to sense the magnetic field created by current in the live AC line of the power line 312, 322 of the load 311, 321.

The relay switch 316, 326 by default will not be activated. When the electrical disabling mechanism 310, 320 is powered, the load ammeter 313, 323 will detect load, and if no load is found, will activate the relay switch 316, 326, which will disconnect the load 311, 321 from the supply.

The light 315, 325 may be arranged in the positive DC line of the electrical disabling mechanism 310, 320 to act as a light emitter indicating the status of the relay switch 316, 326 (e.g., to emit light conditional on whether the socket is disabled or not).

A second light emitting diode may optionally be provided with the load ammeter 313, 323 to indicate if power is being drawn by the socket or not. It may be advantageous for each power outlet socket 151-155 to include a light emitter assembly to emit light conditional on the inductive proximity sensor detecting that the power outlet socket is drawing power and/or is not drawing power.

In a further modification of the first embodiment, the CPU 307 may also be connected directly to the relay switches 316, 326 so that, on detection by the aggregate power ammeter 308 of aggregate drawn current exceeding a second higher threshold, the relay switches 316, 326 may be activated regardless of the drawing state of the sockets.

In this modification, the CPU 307 may include functionality to determine which sockets 151-155 to disable in this way. In one embodiment, only a selection of sockets 151-155 may have their relay switches 316, 326 connected directly to the CPU 307 so that predetermined sockets 151-155 may be disabled in this way, which may enable priority devices to be plugged into sockets 151-155 that do not have the sockets' relay switches 316, 326 directly connected to the CPU 307 and therefore will be safeguarded from power disruption.

Referring to FIG. 3B, a second embodiment shows electrical disabling mechanisms 340, 360 for each load 311, 321, wherein the electrical disabling mechanisms 340, 360 are separate from the load ammeters 331, 351 for each load 311, 321.

The electrical disabling mechanisms 340, 360 may each include a resistor 344, 364, a light 345, 365, and a relay switch 346, 366 which may be equivalent to those described in relation to FIG. 3A.

Each load ammeter 331, 351 is an individual input to the CPU 307, and each electrical disabling mechanism 340, 360 is an individual output from the CPU 307 enabling the CPU 307 to provide the logic of which electrical disabling mechanism 340, 360 is activated, which enables the load ammeters 331, 351 to monitor the power drawing of the loads 311, 321 in lines 312, 322 and to provide this data to the CPU 307. The CPU 307 may monitor which sockets 151-155 are drawing power. The CPU 307 also receives input of the aggregated drawn power of all the sockets 151-155 from the aggregate power ammeter 308 and may determine if the one or more predetermined thresholds has been breached.

If a predetermined first threshold of aggregate power is breached, the CPU 307 may actuate the electrical disabling mechanism 340, 360 of the power sockets 151-155 that are not currently drawing power as determined by the load ammeters 331, 351.

If a predetermined second threshold of aggregate power is then breached, which is higher than the first threshold, the CPU 307 may actuate the electrical disabling mechanism 340, 360 of some of the power sockets 151-155 that are currently drawing power as determined by the load ammeters 331, 351. The CPU 307 may include logic of which drawing sockets 151-155 may be disabled in this way.

It will be understood that FIGS. 3A and 3B show simplified circuit diagrams made for the purpose of illustrating the design principles, and that more sophisticated circuit elements may be used.

Figure 4:
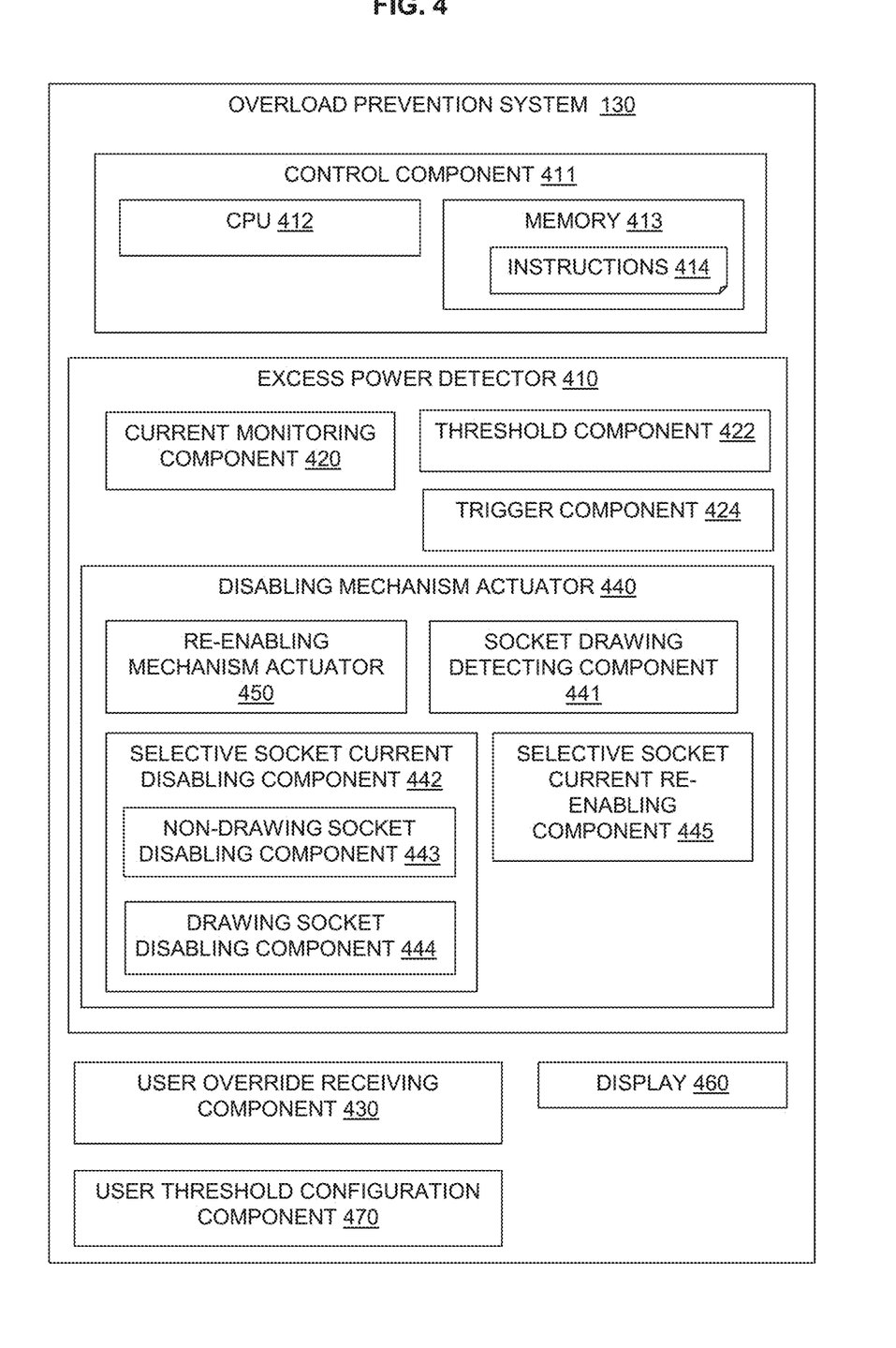
FIG. 4 depicts a block diagram that illustrates the overload prevention system as provided in power distribution units, in accordance with embodiments of the present invention.

Referring to FIG. 4, which depicts a block diagram that illustrates an example embodiment of the overload prevention system 130 as provided in power distribution units 100, 150, in accordance with embodiments of the present invention. The overload prevention system 130 may be incorporated into the power distribution unit 100, 150.

The overload prevention system 130 may include a control component 411 that may be a central processing unit (CPU) 412 that executes instructions 414 provided in memory 413 to carry out the function of the overload prevention system 130. The CPU may be implemented using a single integrated circuit (IC), a number of ICs, discrete transistors, or hardware modules.

The overload prevention system 130 may include an excess power detector 410 which may include a current monitoring component 420 which may receive aggregated current values as determined by an ammeter measuring the current drawn by the combined sockets of the power distribution unit.

The excess power detector 410 may include a threshold component 422 for determining if a first disabling threshold of a maximum acceptable aggregate current has been reached. Optionally, the threshold component 422 may determine whether a second safeguard threshold has been reached above the first threshold to disable additional drawing sockets. Optionally, the threshold component 422 may also determine whether a third re-enabling threshold has been reached below which the aggregate current must fall to re-enable the sockets.

The overload prevention system 130 may include a user threshold configuration component 470 which may enable a user to configure the first, second and third thresholds to a required threshold level of amps or percentage of the capacity of the power distribution unit. There may be preset thresholds, which may be selected.

The excess power detector 410 may include a trigger component 424 for triggering a disabling mechanism actuator 440 for actuating the electrical disabling mechanisms when a first threshold or a second threshold are exceeded and, optionally, for triggering a re-enabling mechanism actuator 450 for de-actuating the electrical disabling mechanism if the aggregate power falls below the third threshold.

The overload prevention system 130 may include a disabling mechanism actuator 440 for actuating disabling mechanisms at the sockets, for example, as shown by the circuit in FIGS. 3A and 3B.

The disabling mechanism actuator 440 may include a selective socket current disabling component 442 may include a non-drawing socket disabling component 443 for activating a disabling mechanism if triggered by the trigger component 424 due to the first threshold being reached, whereby the activation is by determining if no current is being drawn at a socket and activating the switches 221-225 for the sockets 151-155 which are not drawing current. The selective socket current disabling component 442 may also include a drawing socket disabling component 444 for activating a disabling mechanism for drawing sockets if triggered by the trigger component 424 if a higher second threshold of drawn current is reached.

In one embodiment, the disabling mechanism actuator 440 may include a socket drawing detecting component 441 for determining which of the sockets 151-155 is currently drawing a current using the current sensors 211-215, which may be used by the selective socket current disabling component 442 to instruct the disabling of the sockets.

The disabling mechanism actuator 440 may include a selective socket current re-enabling component 445 for selecting the sockets 151-155 for which de-activating of the switches 221-225 should take place when it is safe for the sockets 151-155 to re-enabled, which may be triggered by the trigger component 424 when the aggregate drawn current falls below a third threshold.

The overload prevention system 130 may include a user override receiving component 430 for receiving a user input to override the disabling mechanism actuator 440 in response to an input by a user using the user input device 210 shown in FIG. 2.

The overload prevention system 130 may also include a display 460 for displaying one or more of: the aggregate current, the thresholds at which the triggers are set, an indication that the disabling mechanism is actuated, and an indication that the disabling mechanism has been overridden.

Figure 5A:
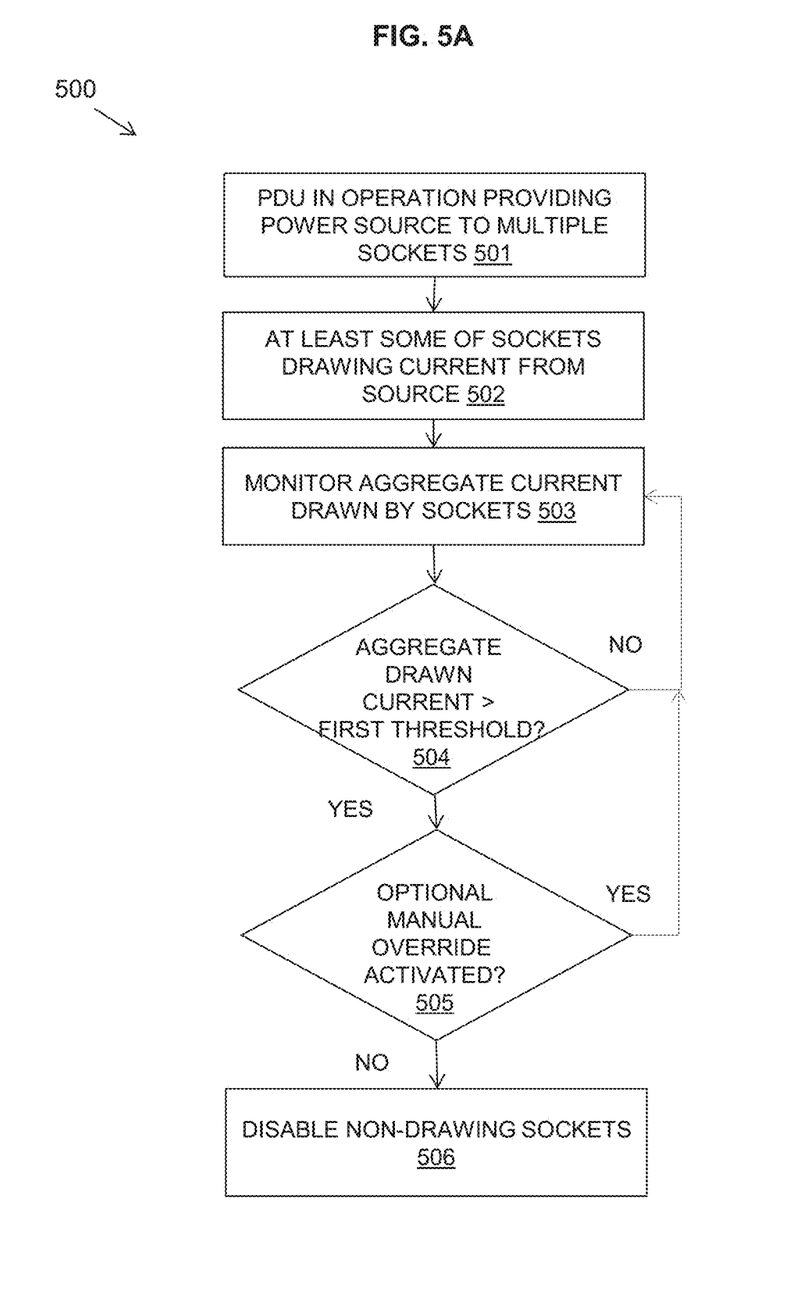
FIG. 5A depicts a flow diagram of a method as carried out by the power distribution unit with control by the control component, in accordance with embodiments of the present invention.

Referring to FIG. 5A, which depicts a flow diagram 500 of a method as carried out by the power distribution unit 100, 150 with control by the control component 411, in accordance with embodiments of the present invention.

A power distribution unit may be in operation at step 501 providing a power source to multiple sockets. At least some of the sockets may be occupied by plugs and drawing current from the source, at step 502.

The method, at step 503 may monitor 503 the aggregate current drawn by the sockets. It may be determined at step 504 if/that the aggregate drawn current is greater than a first threshold. In an exemplary embodiment, the first threshold may be set at approximately 95% of the rated loading of the distribution unit; however, a threshold in the range of 90% to 97% may be provided.

Thresholds of other ranges may be provided depending on how the socket is used, which may be configurable by a user. In data center applications, it may be appropriate for the first threshold to be configured for a particular power distribution unit depending on the use and types of devices served by the unit.

For example, if it is known that there are four of power distribution units in the form of multi-socket devices on a 32 Amp ring, setting the limit for each multi-socket device to be 8 Amp instead of 13 Amp might be preferable. Therefore, the threshold may be lower at approximately 60%.

If it is determined that the first threshold has not been exceeded, the method may loop to continue to monitor the aggregate current, at step 503. If it is determined that the first threshold has been exceeded, it may optionally be determined at step 505 if a manual override has been activated. A manual override may be activated if a user is confident that a subsequently added or switched on plug will not compromise the capacity of the power distribution unit.

Such a manual override may not be provided or allowed in environments where the override runs an unacceptable risk.

If it is determined at step 505 that a manual override has been activated, the method may loop to continue to monitor the aggregate current at step 503. An additional safety threshold may be provided at a higher percentage, for example 99% of the rated loading for disabling the remaining sockets, if appropriate.

If it is not determined at step 505 that a manual override has been activated or if the manual override is not allowed, the method may disable the sockets which are not currently drawing current by switching off the current to these sockets at step 506.

Disabling sockets which are currently drawing power may send a signal to all sockets which activates a circuit to determine if a current is being drawn and, if not, switching the current off to the socket. Alternatively, a component may monitor which currents are drawing current and may send a signal to circuits at the sockets that are not drawing power to disable the non-drawing sockets.

Figure 5B:
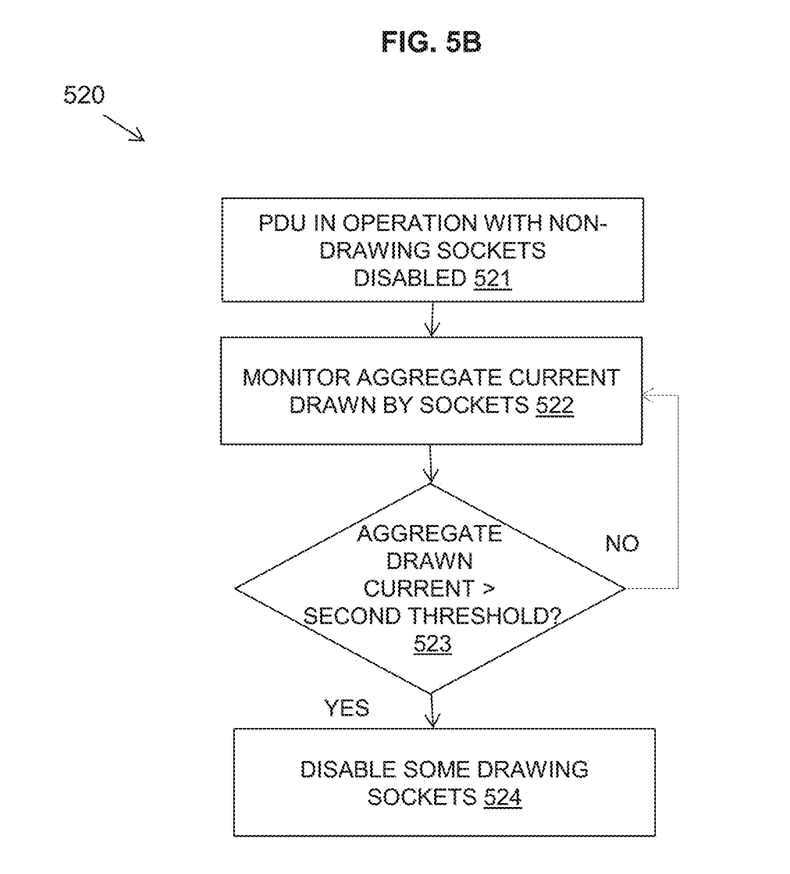
FIG. 5B depicts a flow diagram of a further aspect of a method as carried out by the power distribution unit with control by the control component, in accordance with embodiments of the present invention.

Referring to FIG. 5B, which depicts a flow diagram 520 of a further aspect of a method as carried out by the power distribution unit 100, 150 with control by the control component 411, in accordance with embodiments of the present invention.

A power distribution unit may be in operation at step 521 providing a power source to multiple sockets with non-drawing sockets disabled. The method may monitor the aggregate current drawn by the active sockets at step 522.

It may be determined at step 523 if the aggregate drawn current is greater than a second safeguard threshold. In an exemplary embodiment, the second threshold may be set at the maximum of the rated loading of the distribution unit.

If it is determined that the second threshold has not been exceeded, the method may loop to continue to monitor the aggregate current at step 522.

If it is determined that the second threshold has been exceeded, the method may disable some of the drawing sockets at step 524. The sockets to be disabled may be selected randomly or according to a predefined configuration. Some sockets may be protected from disabling if the sockets supply priority devices.

Figure 5C:
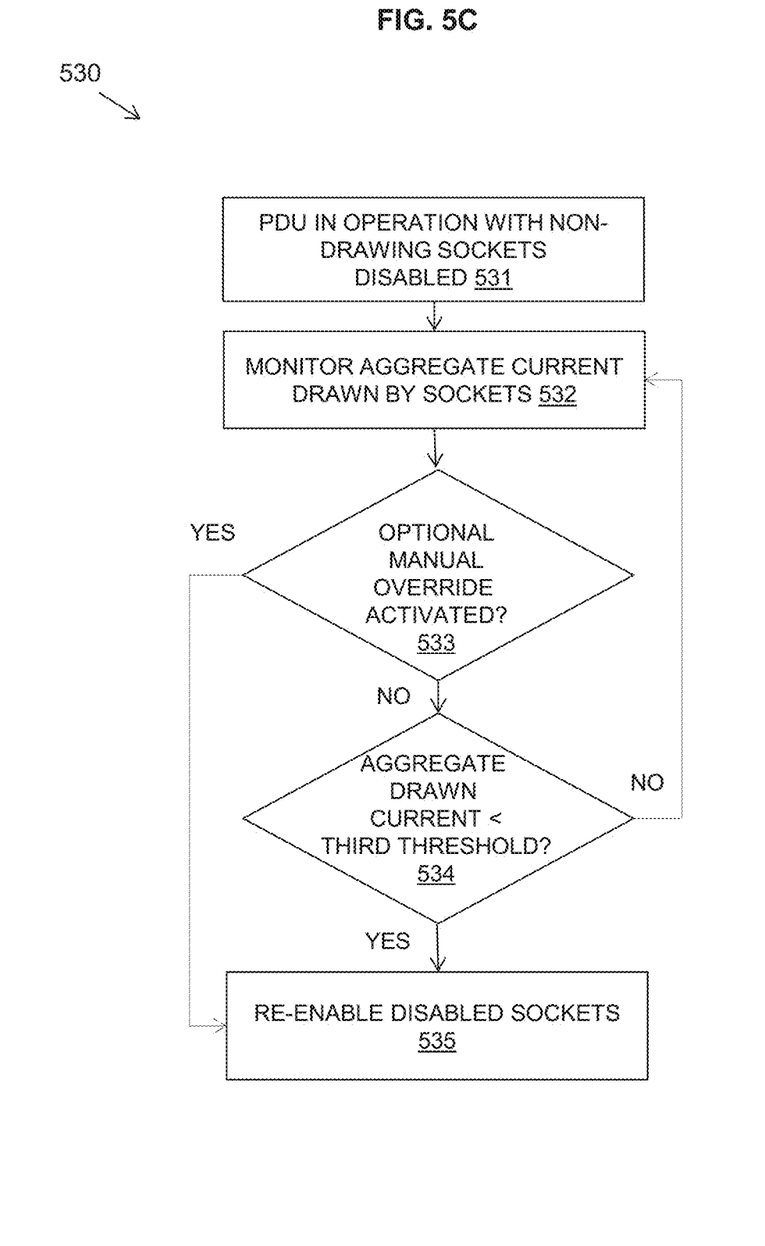
FIG. 5C depicts a flow diagram of a further aspect of a method as carried out by the power distribution unit with control by the control component, in accordance with embodiments of the present invention

Referring to FIG. 5C, which depicts a flow diagram 530 of a further aspect of a method as carried out by the power distribution unit 100, 150 with control by the control component 411, in accordance with embodiments of the present invention.

A power distribution unit may be in operation at step 531 providing a power source to multiple sockets with non-drawing sockets disabled. The method may monitor the aggregate current drawn by the active sockets at step 532.

At step 533, it may be determined if a manual override is activated by a user. If a manual override is activated, the control system may re-enable the disabled sockets at step 535.

If a manual override has not been activated, it may be determined at step 534 if the aggregate drawn current is less than a third threshold. The third threshold may be set at a percentage of the rated loading of the distribution unit at which it is considered safe to add another active socket to draw current, which may be based on a ratio of the number of sockets in the power distribution unit, or based on an average current drawing of a socket. A suitable range for the third threshold may be, for example, 50% to 70%. Again, the third threshold may be configured by a user depending on the situation in which the power distribution unit is being used.

If it is determined at step 534 that the aggregate current is not below the third threshold, the method may loop to continue to monitor the aggregate current at step 532. If it is determined at step 534 that the aggregate current is below the third threshold, the method may re-enable the disabled sockets at step 535, which may be the non-drawing sockets and/or any disabled previously drawing sockets.

Optionally, there may be a further manual override to prevent re-enabling the disabled sockets, if a user or supervisor wishes to keep the remaining sockets disabled, for example, the supervisor may know that an increase in current from one of the existing appliances is imminent.

The described power distribution unit prevents the ability of unknowingly creating a risk of overloading. Utilizing existing technologies, such as metering the power draw of appliances, a threshold is set of the rated loading of the distribution unit.

Embodiments of the system provide a safeguard where plugs are already inserted into sockets but devices are not yet turned on. If the aggregate drawn current from the active sockets reaches a threshold, the occupied but non-drawing sockets may be disabled without needing to unplug the devices. At the point the threshold is reached by devices drawing current from the power pole, individual sockets that are currently not drawing load are disabled by using a relay to prevent additional current draw. An indicator light may be illuminated to alert the operator to the reason for non-operation. Sockets that are already drawing current are allowed to continue.

In the case that a device that is already drawing load increases the device's draw and the maximum load for the power pole is exceeded, the device may automatically disable sockets that are currently drawing power, which could be at random, or in a predefined order.

There may be a requirement of an "I don't care" button to override the warning, which would allow someone to manually enable a 0.1 A device in a socket that is running under the maximum but the user is happy to increase the load.

Figure 6:
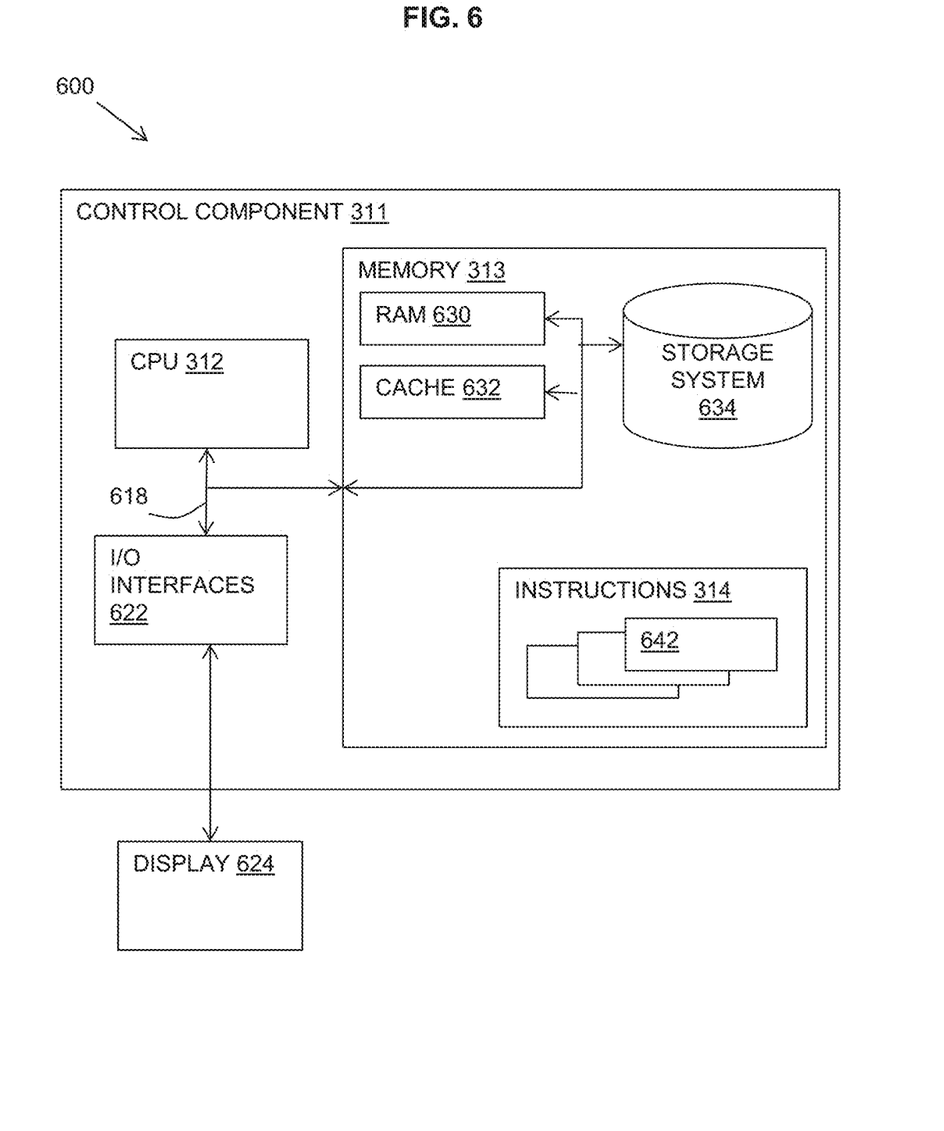
FIG. 6 depicts a schematic view of a control component, in accordance with embodiments of the present invention.

FIG. 6 depicts a schematic view of a control component 411, in accordance with embodiments of the present invention. The control component 411 may be used in the described system.

The control component 411 may be described in the general context of computer system-executable instructions, such as program modules, being executed by a computer system. Generally, program modules may include routines, programs, objects, components, logic, data structures, and so on that perform particular tasks or implement particular abstract data types.

The components of the control component 411 may include, but are not limited to, one or more central processing units (CPUs) 412, a system memory 413, and a bus 618 that couples various system components including system memory 413 to the CPU 412.

Bus 618 represents one or more of any of several types of bus structures, including a memory bus or memory controller.

System memory 413 can include computer system readable media in the form of volatile memory, such as random access memory (RAM) 630 and/or cache memory 632. As will be further depicted and described below, memory 413 may include at least one program product or instruction 414 having a set (e.g., at least one) of program modules that are configured to carry out the functions of embodiments of the invention.

Computer system 612 may also communicate with one or more external puts and outputs including an output display 624. Such communication can occur via Input/Output (I/O) interfaces 622.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. An electrical power distribution unit for overload prevention comprising:
   a plurality of electrical power outlet sockets, each electrical power outlet socket of the plurality of electrical power outlet sockets configured to receive a power plug;
   a power distribution system for supplying electrical power to the plurality of electrical power outlet sockets; and
   an excess power detector for detecting an aggregate power drawn from the plurality of electrical power outlet sockets and for actuating a disabling mechanism for disabling power supply for a subset of the plurality of electrical power outlet sockets in response to the detected aggregate power exceeding a predetermined first threshold, wherein the subset of the plurality of electrical power outlet sockets are sockets that are detected as currently not drawing power;
   wherein the excess power detector includes:
   a predetermined second threshold above the first threshold and, in response to the detected aggregate power exceeding the predetermined second threshold, the excess power detector actuating the disabling mechanism for an additional subset of sockets, wherein the additional subset of sockets are currently drawing power, and
   a predetermined third threshold that is set at a percentage of a rated loading of the electrical power distribution unit, based on at least one of: a ratio of a number of sockets in the electrical power distribution unit and an average current drawing of a socket, and, in response to the detected aggregate power being below the predetermined third threshold, de-actuating the disabling mechanism for a third subset of sockets, and wherein the predetermined third threshold is below the predetermined first threshold.

2. The electrical power distribution unit as claimed in claim 1, wherein the excess power detector includes a disabling mechanism actuator for a disabling mechanism in the form of a circuit at each socket that switches off power to the socket if the socket is not drawing power.

3. The electrical power distribution unit as claimed in claim 2, wherein the circuit includes a current sensor which actuates a switch to switch off power to the socket if no power is sensed.

4. The electrical power distribution unit as claimed in claim 2, wherein the circuit includes a current sensor which sends a signal to the disabling mechanism actuator which actuates the disabling mechanism for all sockets for which no power is sensed.

5. The electrical power distribution unit as claimed in claim 1, wherein the additional subset of sockets is selected randomly or in a predefined order.

6. The electrical power distribution unit as claimed in claim 1, further comprising a user input device for overriding the excess power detector to prevent actuation of the disabling mechanism, or to de-actuate the disabling mechanism.

7. The electrical power distribution unit as claimed in claim 1, wherein the excess power detector includes a current monitoring component for monitoring the detected aggregate power drawn from the sockets and a threshold component for determining if the detected aggregate power exceeds the predetermined first threshold.

8. The electrical power distribution unit as claimed in claim 7, wherein the threshold component is configurable by a user depending on the circumstances of use of the power distribution unit.

9. The electrical power distribution unit as claimed in claim 1, wherein the excess power detector includes a control component having a processor and a memory configured to provide computer program instructions to the processor to execute the control and a triggering component for triggering the disabling mechanism when the control component determines that the predetermined first threshold has been exceeded.

10. The electrical power distribution unit as claimed in claim 9, further comprising a user override receiving component for receiving a user input to override the control component and overriding the control component.

11. The electrical power distribution unit as claimed in claim 10, wherein the user override receiving component prevents a triggering of the electrical disabling mechanism or, if the non-drawing sockets are already disabled, de-actuates the disabling mechanism.

12. The electrical power distribution unit as claimed in claim 1, wherein the electrical power distribution unit is one of: a domestic adapter for connection to a mains supply, an industrial adapter for connection to an industrial power supply, and a distribution unit for a data center with a commercial power supply.

13. The electrical power distribution unit as claimed in claim 1, wherein the excess power detector for detecting an aggregate power drawn from the sockets includes an ammeter suitable for alternating or direct current measurement.

14. The electrical power distribution unit as claimed in claim 1, wherein the predetermined first threshold is configured as a percentage of the rated loading of the electrical power distribution unit or the predetermined first threshold is configured as a maximum loading for specified appliances being powered by the power distribution unit.

15. A method for preventing overload of an electrical power distribution unit, the electrical power distribution unit having:
   a plurality of electrical power outlet sockets each configured to receive a power plug, and a power distribution system for supplying electrical power to each electrical power outlet socket of the plurality of electrical power outlet sockets, and at least one of the sockets being selectively disabled by a disabling mechanism controlled by an excess power detector,
   the method comprising:
      controlling, by a processor of a computing system, the selective disabling of the one or more sockets by:
         monitoring, by the processor, an aggregate power drawn from the sockets;
         determining, by the processor, if the aggregate power exceeds a predetermined first threshold;
         actuating, by the processor, a disabling mechanism for a subset of the power outlet sockets that are detected as currently not drawing power;
         determining, by the processor, if the aggregate power exceeds a predetermined second threshold above the first threshold and, in response to the detected aggregate power exceeding the predetermined second threshold, actuating the disabling mechanism for an additional subset of sockets, wherein the additional subset of sockets are currently drawing power, and
         determining, by the processor, if the aggregate power is below a predetermined third threshold that is set at a percentage of a rated loading of the electrical power distribution unit, based on at least one of: a ratio of a number of sockets in the electrical power distribution unit and an average current drawing of a socket, and, in response to the detected aggregate power being below the predetermined third threshold, de-actuating the disabling mechanism for a third subset of sockets, and wherein the predetermined third threshold is below the predetermined first threshold.

16. A computer program product for preventing overload of an electrical power distribution unit having a plurality of electrical power outlet sockets each having a plurality of electrical power outlet sockets configured to receive a power plug and a power distribution system for supplying electrical power to each of the plurality of electrical power outlet sockets, and at least one of the sockets being selectively disabled by a disabling mechanism controlled by an excess power detector, the computer program product comprising a computer readable hardware storage device storing a computer readable program code, the computer readable program code comprising an algorithm that when executed by a computer processor of a computing system implements a method for facilitating usage of a software program on a computing system, the method comprising:
   controlling, by the processor, the selective disabling of the one or more sockets by:
      monitoring, by the processor, an aggregate power drawn from the sockets;
      determining, by the processor, if the aggregate power exceeds a predetermined first threshold;
      actuating, by the processor, a disabling mechanism for a subset of the power outlet sockets that are detected as currently not drawing power;
      determining, by the processor, if the aggregate power exceeds a predetermined second threshold above the first threshold and, in response to the detected aggregate power exceeding the predetermined second threshold, actuating the disabling mechanism for an additional subset of sockets, wherein the additional subset of sockets are currently drawing power, and
      determining, by the processor, if the aggregate power is below a predetermined third threshold that is set at a percentage of a rated loading of the electrical power distribution unit, based on at least one of: a ratio of a number of sockets in the electrical power distribution unit and an average current drawing of a socket, and, in response to the detected aggregate power being below the predetermined third threshold, de-actuating the disabling mechanism for a third subset of sockets, and wherein the predetermined third threshold is below the predetermined first threshold.

* * * * *